United States Patent
Han et al.

(10) Patent No.: US 11,202,184 B2
(45) Date of Patent: Dec. 14, 2021

(54) METHOD FOR CONTROLLING AT LEAST ONE DEVICE WITH WHICH MOBILE DEVICE CAN COMMUNICATE IN WIRELESS COMMUNICATION SYSTEM, AND MOBILE DEVICE

(71) Applicant: SAMSUNG ELECTRONICS CO., LTD., Suwon-si (KR)

(72) Inventors: Ji-Yeon Han, Suwon-si (KR); Jun-Ho Koh, Suwon-si (KR); Tae-Jin Woo, Suwon-si (KR); Jong-Hyuk Jang, Suwon-si (KR); Yang-Wook Kim, Hwaseong-si (KR); Jae-Ho Jung, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 698 days.

(21) Appl. No.: 16/071,388

(22) PCT Filed: Jan. 19, 2017

(86) PCT No.: PCT/KR2017/000681
§ 371 (c)(1),
(2) Date: Jul. 19, 2018

(87) PCT Pub. No.: WO2017/126914
PCT Pub. Date: Jul. 27, 2017

(65) Prior Publication Data
US 2021/0176617 A1    Jun. 10, 2021

(30) Foreign Application Priority Data

Jan. 19, 2016  (KR) .................. 10-2016-0006617

(51) Int. Cl.
*H04W 4/90* (2018.01)
*H04W 4/70* (2018.01)
(Continued)

(52) U.S. Cl.
CPC ............... *H04W 4/90* (2018.02); *H04W 4/70* (2018.02); *H04W 4/80* (2018.02); *H04W 52/028* (2013.01);
(Continued)

(58) Field of Classification Search
CPC ....... H04W 4/90; H04W 52/028; H04W 4/70; H04W 76/50; H04W 76/19; H04W 76/40; H04W 76/14; H04W 76/15; H04W 4/80
See application file for complete search history.

(56) References Cited

U.S. PATENT DOCUMENTS 9,775,017 B2 *  9/2017  Papa ..................... H04W 4/90
2010/0272083 A1  10/2010  Itoh et al.
(Continued)

FOREIGN PATENT DOCUMENTS

CN  101790145 A   7/2010
CN  101873695 A   10/2010
(Continued)

OTHER PUBLICATIONS

International Search Report (PCT/ISA/210) dated Apr. 21, 2017 issued by the International Searching Authority in International Application No. PCT/KR2017/000681.
(Continued)

*Primary Examiner* — Dong-Chang Shiue
(74) *Attorney, Agent, or Firm* — Sughrue Mion, PLLC

(57) ABSTRACT

The present disclosure relates to a technique for sensor network, machine to machine (M2M), machine type communication (MTC) and Internet of Things (IoT). This disclosure comprises transitioning to a first mode when a condition is satisfied connecting to at least one peripheral device, requesting status information from the connected at least one peripheral device and obtaining the same checking a connection state with a base station, transmitting, to the
(Continued)

base station, the status information on the obtained at least one peripheral device when the connection with the base station is maintained, and transmitting host indication information to a peripheral device indicated by the host indication information when receiving the host indication information indicating one of the at least one peripheral device from the base station.

16 Claims, 12 Drawing Sheets

(51) Int. Cl.
    *H04W 76/10*     (2018.01)
    *H04W 76/50*     (2018.01)
    *H04W 76/14*     (2018.01)
    *H04W 4/80*     (2018.01)
    *H04W 52/02*     (2009.01)

(52) U.S. Cl.
    CPC ........... *H04W 76/10* (2018.02); *H04W 76/14* (2018.02); *H04W 76/50* (2018.02)

(56) References Cited

U.S. PATENT DOCUMENTS

| | | |
|---|---|---|
| 2011/0237287 A1 | 9/2011 | Klein et al. |
| 2013/0273907 A1* | 10/2013 | Vikberg ............... H04W 76/23 455/426.1 |
| 2014/0011469 A1 | 1/2014 | Fenn et al. |
| 2014/0038580 A1 | 2/2014 | Kim et al. |
| 2014/0051379 A1 | 2/2014 | Ganesh et al. |
| 2015/0215757 A1 | 7/2015 | Miskiewicz et al. |
| 2015/0358799 A1 | 12/2015 | Miyakawa et al. |
| 2016/0209907 A1 | 7/2016 | Han et al. |
| 2018/0020337 A1* | 1/2018 | Papa ....................... H04W 4/90 |
| 2020/0137562 A1* | 4/2020 | Liang .................... H04W 12/50 |
| 2020/0162877 A1* | 5/2020 | Papa ....................... H04W 4/90 |

FOREIGN PATENT DOCUMENTS

| | | | | |
|---|---|---|---|---|
| CN | 102859980 A | | 1/2013 | |
| CN | 104541529 A | | 4/2015 | |
| EP | 2768269 A1 | * | 8/2014 | ............. H04W 4/90 |
| EP | 2 800 442 A1 | | 11/2014 | |
| EP | 2800442 A1 | * | 11/2014 | ............. H04W 4/90 |
| EP | 2800442 A1 | | 11/2014 | |
| EP | 2 869 659 A1 | | 5/2015 | |
| KR | 10-2013-0028317 A | | 3/2013 | |
| KR | 10-2015-0094065 A | | 8/2015 | |
| WO | WO-2010017768 A1 | * | 2/2010 | ............. H04L 67/14 |
| WO | WO-2012082024 A1 | * | 6/2012 | ............ H04W 76/23 |
| WO | 2014/113083 A1 | | 7/2014 | |
| WO | 2015/026197 A1 | | 2/2015 | |
| WO | WO-2015026197 A1 | * | 2/2015 | ........ H04M 1/72421 |

OTHER PUBLICATIONS

Communication dated Jan. 19, 2021, issued by the Korean Intellectual Property Office in Korean English Patent Application No. 10-2016-0006617.
Communication dated Feb. 28, 2019, issued by the European Patent Office in counterpart European Application No. 17741680.7.
Communication dated Jul. 22, 2020, issued by the Korean Intellectual Property Office in Korean Application No. 10-2016-0006617.
Communication dated Jul. 3, 2020, from The China National Intellectual Property Administration in Application No. 201780007729.3.

* cited by examiner

| Payload[User define] | CAPACITY[38byte] VALUE |
|---|---|
| DEVICE TYPE [SMART PHONE:3, WEARABLE:2, FEATURE PHONE:1] | 1byte |
| BATTERY AMOUNT [BATTERY REMAINING AMOUNT Full:5, RATIO% F:100] - IN CASE THAT THERE ARE SAME VALUES → NEXT STAGE - ALL VALUES< 3 → NEXT STAGE | 2byte |
| FUNCTION/SERVICE LIST [SUM OF NUMBER OF POSSESSED FUNCTIONS] | 2byte |
| NUMBER OF CONNECTED DEVICES [MAX NUMBER: 256] | 1byte |
| LOCATION [LATITUDE: LONGITUDE: ALTITUDE] | 4byte |

| | FIRST DEVICE (SMART PHONE A) | SECOND DEVICE (WATCH) | THIRD DEVICE (SMART PHONE B) |
|---|---|---|---|
| | 3 | 2 | 3 |
| | 3 | 3 | 5 |
| | 7 | 7 | 6 |
| | 1 | 0 | 0 |
| | SELECTED AS HOST | SELECTED AS CLIENT | SELECTED AS CLIENT SELECTED AS NEXT HOST |

FIG.2C

METHOD FOR CONTROLLING AT LEAST ONE DEVICE WITH WHICH MOBILE DEVICE CAN COMMUNICATE IN WIRELESS COMMUNICATION SYSTEM, AND MOBILE DEVICE

CROSS-REFERENCE TO RELATED APPLICATION(S)

This application is a National Phase Entry of PCT International Application No. PCT/KR2017/000681, which was filed on Jan. 19, 2017, and claims priority to Korean Patent Application No. 10-2016-0006617, which was filed on Jan. 19, 2016, the contents of which are incorporated herein by reference.

BACKGROUND

1. Field

The present disclosure relates to a method and mobile device for controlling at least one device with which the mobile device may communicate in a wireless communication system.

2. Description of the Related Art

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the big data processing technology through connection with a cloud server, has emerged.

As technology elements, such as "sensing technology", "wired/wireless communication and network infrastructure", "service interface technology", and "security technology" have been demanded for IoT implementation, a sensor network, a Machine to Machine (M2M) communication, Machine Type Communication (MTC), and so forth have been recently researched.

Such an IoT environment may provide intelligent Internet Technology (IT) services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing IT and various industrial applications.

In a modern society, a mobile device for a mobile communication has been used as a necessity according to popularization of the mobile communication. A smart phone has been introduced, and a wearable device, an appcessory, and/or the like which support some functions by interworking with the smart phone have been developed. So, users may generally use one or more mobile devices, and have at least one connectable devices to control the at least one connectable devices based on a mobile device.

Despite development of a communication environment, an emergency situation in which a traffic accident, an explosion, an environmental pollution accident, collapse of a building, a fire, a natural disaster, crime, and/or the like which may occur at unpredictable time and a unspecific place occur and emergency rescue is required may occur at unpredictable time and a unspecific place. If an emergency situation occurs, a rescuer may request emergency rescue using a mobile device. For this, a survivor continuously need to notify a rescue crew of rescue request information including location information, and health status of the survivor, or progress of the emergency situation, and/or the like. Long time may be consumed until the rescue is completed according to a degree of the emergency situation. So, there is a need for a scheme of effectively operating battery power of a mobile device until rescue for a survivor is completed.

SUMMARY

The present disclosure proposes a method and apparatus for effectively using power of a mobile device in an emergency situation.

The present disclosure proposes a method and apparatus for performing an emergency communication by interworking with neighbor devices based on a connection function of a mobile device in an emergency situation.

The present disclosure proposes a method and apparatus for controlling neighbor devices in a mobile device in an emergency situation.

A method of a mobile device for performing communication with at least one peripheral device in a wireless communication system according to an embodiment of the present disclosure includes transitioning to a first mode if a predetermined condition is satisfied; connecting with the at least one peripheral device and requesting status information from the connected at least one peripheral device to obtain the status information; checking access status with a base station; if an access with the base station is maintained, transferring the obtained status information for the at least one peripheral device to the base station; upon receiving host indication information from the base station, transferring the host indication information to a peripheral device indicated by the host indication information; and receiving control information from the peripheral device.

A mobile device for performing communication with at least one peripheral device in a wireless communication system according to an embodiment of the present disclosure includes a transceiver configured to connect with the at least one peripheral device and to request status information from the connected at least one peripheral device to obtain the status information under control of a controller; and the controller configured to transition to a first mode if a predetermined condition is satisfied, to check access status with a base station, to control the transceiver to transfer the obtained status information for the at least one peripheral device to the base station if an access with the base station is maintained, to control the transceiver to transfer host indication information to a peripheral device indicated by the host indication information if the host indication information is received from the base station, and to control the transceiver which receives control information from the peripheral device.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith, "as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

FIG. 2c is an example of a figure for describing an operation of determining a final host according to an embodiment of the present disclosure;

DETAILED DESCRIPTION

Figure 1A:
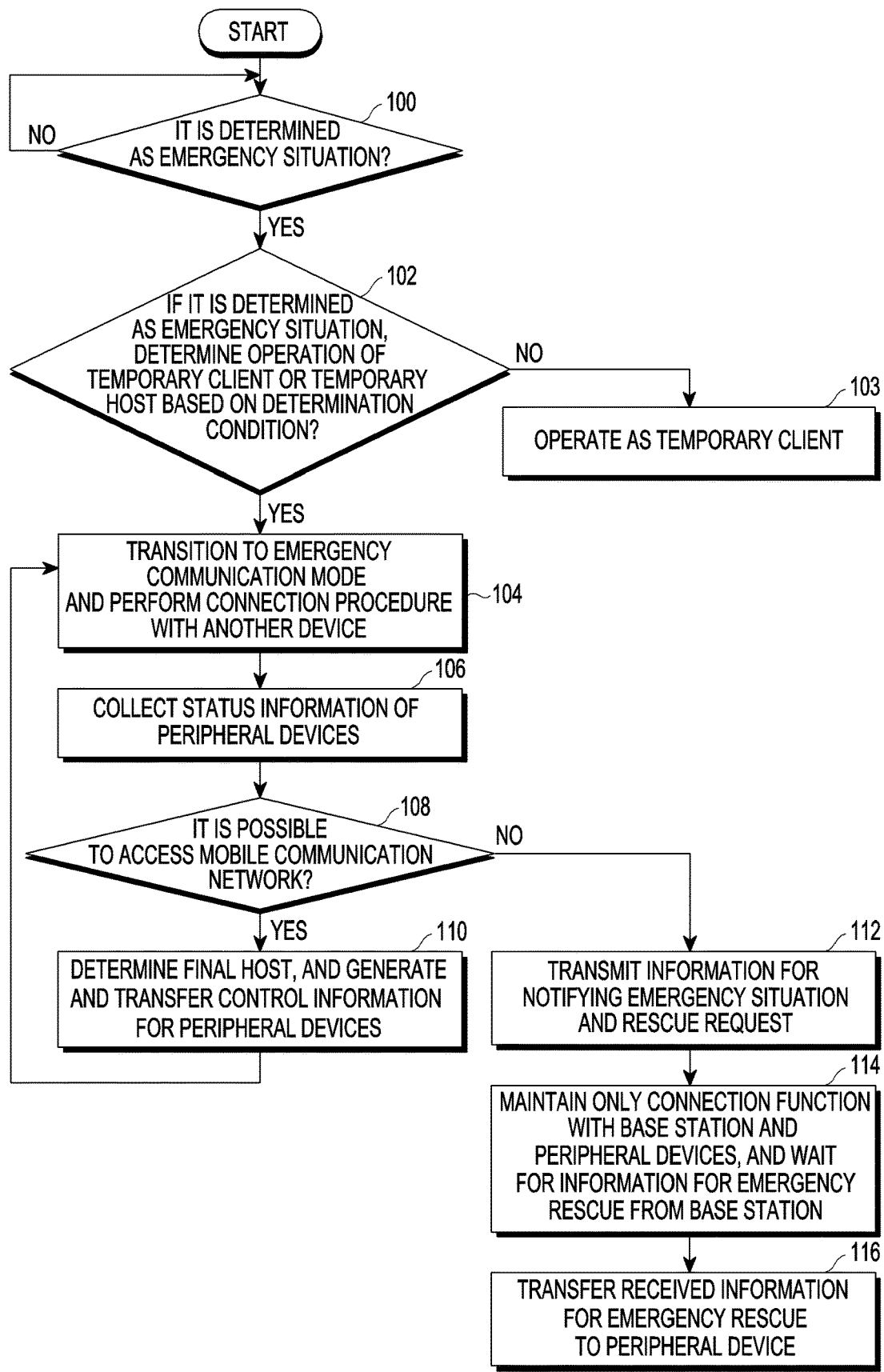
FIG. 1a is an example of an operation flowchart in a case that a mobile device transitions to an emergency mode according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although ordinal numbers such as "first," "second," and so forth will be used to describe various components, those components are not limited herein. The terms are used only for distinguishing one component from another component. For example, a first component may be referred to as a second component and likewise, a second component may also be referred to as a first component, without departing from the teaching of the inventive concept. The term "and/or" used herein includes any and all combinations of one or more of the associated listed items.

The terminology used herein is for the purpose of describing various embodiments only and is not intended to be limiting. As used herein, the singular forms are intended to include the plural forms as well, unless the context clearly indicates otherwise. It will be further understood that the terms "comprises" and/or "has," when used in this specification, specify the presence of a stated feature, number, step, operation, component, element, or combination thereof, but do not preclude the presence or addition of one or more other features, numbers, steps, operations, components, elements, or combinations thereof.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology.

According to various embodiments of the present disclosure, an electronic device may include communication functionality. For example, an electronic device may be a smart phone, a tablet personal computer (PC), a mobile phone, a video phone, an e-book reader, a desktop PC, a laptop PC, a netbook PC, a personal digital assistant (PDA), a portable multimedia player (PMP), an mp3 player, a mobile medical device, a camera, a wearable device (e.g., a head-mounted device (HMD), electronic clothes, electronic braces, an electronic necklace, an electronic appcessory, an electronic tattoo, or a smart watch), a fitness band IoT device, a rescue worker's communication terminal, a terminal for rescue or disaster, and/or the like.

According to various embodiments of the present disclosure, an electronic device may be a smart home appliance with communication functionality. A smart home appliance may be, for example, a television, a digital video disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., magnetic resonance angiography (MRA) device, a magnetic resonance imaging (MRI) device, computed tomography (CT) device, an imaging device, or an ultrasonic device), a navigation device, a global positioning system (GPS) receiver, an event data recorder (EDR), a flight data recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, a mobile device and neighbor devices which are connected with the mobile device may be any combination of the foregoing devices. In addition, it will be apparent to one having ordinary skill in the art that an electronic device according to various embodiments of the present disclosure is not limited to the foregoing devices.

The present disclosure proposes a method and apparatus for performing an emergency communication in cooperation with neighbor devices based on a device-to-device connection function in an emergency situation in a mobile device. Here, the neighbor devices may include other communication devices which a survivor who is in an emergency situation has, or other user's mobile device or communication devices. According to an embodiment, the neighbor devices may correspond to, for example, devices which are located within a range where a Bluetooth communication is possible, e.g., 1 km from a corresponding mobile device.

In specification, an emergency communication may include an operation of receiving signals related to coping with an emergency situation and emergency rescue transmitted from a designated institute which supports a rescuer or emergency rescue for emergency rescue for survivors who suffer from the emergency situation, an operation of transmitting emergency situation-related information to a corresponding server or rescuer, and/or the like. Further, the emergency communication may include an operation of receiving signals related to rescue for emergency rescue for users of a neighbor device, an operation of transmitting emergency situation-related information to a corresponding server or rescuer, and/or the like.

FIG. 1a is an example of an operation flowchart in a case that a mobile device transitions to an emergency mode according to an embodiment of the present disclosure.

Referring to FIG. 1a, a mobile device according to an embodiment of the present disclosure determines whether it is an emergency situation at operation 100. According to an embodiment of the present disclosure, the mobile device may determine that the emergency situation occurs in a case that a user of the mobile device directly recognizes the emergency situation and activates an emergency mode of the mobile device, a case that the mobile device recognizes the emergency situation through an equipped sensor module for sensing the emergency situation, a case that another user senses the emergency situation and the another user's emergency communication request signal is received, or a case that emergency communication-related information is received through a base station. The sensor module may be implemented with, for example, various sensors such as a sensor for sensing a motion or location of an object, a terrestrial magnetism sensor, an acceleration sensor, and/or the like, a composite sensor in which a function such as an altimeter, a gyro, and/or the like is included as one chip, and/or the like. In this case, the mobile device may operate as the following for notifying the emergency situation to other peoples who exist at a place where the emergency situation occurs. A sensor module within the mobile device may transfer emergency situation information including a sensed value for a recognized emergency situation to an institute which supports a coping and rescue function, and/or the like upon the emergency situation, or a server which is located at the place through the base station. The place where the emergency situation occurs may be a house or a building. The emergency situation information may be transferred to a server which provides an application which supports a coping and rescue function, and/or the like upon the emergency situation by running the application. When it is notified that the emergency situation occurs from a corresponding mobile device, the server may transfer the emergency situation information by broadcasting the emergency situation information to devices which are located at a corresponding place and may communicate.

If it is not the emergency situation according to the determined result at operation 100, the mobile device performs a normal operation and waits for an emergency situation. According to another embodiment, the mobile device may determine that an emergency situation occurs by receiving emergency situation information transmitted according to request of another user who senses the emergency situation. The emergency situation information may be provided by, for example, an institute which supports a coping and rescue function upon an emergency situation, and/or the like, or a server of an application, and a server which is installed at a place where the emergency situation occurs. Here, emergency situation information may be transferred as a language or a predetermined sign. More particularly, the emergency situation information may be included in a text message including information about a uniform resource locator (URL) which may be connected on an emergency mode, and/or the like, a disaster text message transmitted by a mobile device, an information message in a social network service (SNS) (for example, Twitter, Facebook, KaKaoTalk, and/or the like), a push message (for example, an apple push notification service (APNS)), and/or the like. The push message is a message which is transferred at an arbitrary time point set by a user even though a specific application is not run. If it is the emergency situation according to the determined result at operation 100, the mobile device determines whether to operate as a temporary host or a temporary client on upon an emergency communication according to an embodiment of the present disclosure based on a determination criterion for an emergency criterion at operation 102. Concretely, if the mobile device senses the emergency situation by a user or though a sensor module in a determining process at operation 100, the mobile device determines to operate as the temporary host for the emergency communication. FIG. 1c is an example of an operation flowchart in which a mobile device determines an emergency situation and operates according to an embodiment of the present disclosure. Referring to FIG. 1c, a mobile device may internally transmit information or a signal through a modem layer 140, a radio interface layer (RIL) 150, a framework layer 160, and an application layer 170. The modem layer 140 receives a message which corresponds to emergency situation information from, for example, a disaster notification device at operation 142. The disaster notification device is a device which transmits situation information about a danger, and may correspond to, for example, at least one of a device included in a disaster agency, a server which provides an application installed at the mobile device and supports a coping and rescue function upon an emergency situation, and/or the like, a server which provides a push notification message, and a server included in a building where a danger occurs. The message corresponding to the emergency situation information may be, for example, one of a cell broadcasting service (CBS) message and a message transmitted by an earthquake and tsunami warning system (ETWS).

A message received in the modem layer 140 is transferred to the framework layer 160 through an interface between the modem layer 140 and the RIL 150 and an interface between the RIL 150 and the framework layer 160. Upon identifying danger information from the emergency situation information included in the message at operation 162, the framework layer 160 determines whether it is an emergency situation based on the identified danger information at operation 164. A method of determining whether the identified danger information is the emergency situation will be described below. The framework layer 160 parses situation information (e.g., a text phrase) included in the received message on a word basis to identify danger information for at least one of a type of danger, a place where danger occurs, and scale of danger. The kind of danger may be classified into, for example, fire, heavy rain, a typhoon, an earthquake, heat wave, cold wave, a traffic accident, and/or the like, and the place where the danger occurs may be classified into, for example, an inside of a house, an outside of the house, an inside of a company, an outside of the company, an inside of a building, an outside of the building, an inside of a vehicle, an outside of the vehicle, and/or the like. The scale of danger denotes a degree by which danger is progressed, and may be classified into, for example, forewarning, warning, damage, intensity, and/or the like.

For example, it will be assumed that a text "En earthquake of intensity 5 occurs in suwon" is included in the message received in the framework layer 160 as danger information. In this case, if terms such as "지진", "earthquake", and "地震" are included in the danger information, there is very high probability that terms such as "진도", "Intensity", "震度", and/or the like, so the framework layer 160 identifies 'intensity N', and may determine that the danger information is related to an emergency situation if the identified N is equal to or greater than a preset threshold value, and may determine that the danger information is related to a situation which is not urgent if the identified N is less than the preset threshold value. For another example, in a case that a text "Tsunami occurs at 20 km off Incheon" is included in the received message as the danger information, if terms such as "해일", "tsunami", "진파", "津波", and/or the like are included in the danger information, there is very high probability that a distance from a point at which the tsunami occurs is included in the danger information, the framework layer 160 identifies 'N km', and may determine that the danger information is related to an emergency situation if the identified distance N is equal to or greater than a preset threshold value, and may determine that the danger information is related to a situation which is not urgent if the identified distance N is less than the preset threshold value.

If the danger information indicates the emergency situation according to the identified result, the framework layer 160 may transmit a control signal indicating transition to an emergency mode to the application layer 170. If the danger information indicates that it is not the emergency situation, the framework layer 160 may transmit a control signal indicating transition to a warning mode to the application layer 170.

A mobile device which transitions to an emergency mode 172 may control an inner operation such that only some functions may be performed for minimizing power consumption. For example, the mobile device may control to activate a global positioning system (GPS) function and a wireless connection function for providing a rescuer with current location information and deactivate remaining functions. For another example, the mobile device which transitions to the emergency mode 172 may control to activate a sensor for sensing biometric information and a wireless connection function for providing a rescuer with a user's health status and deactivate remaining functions. For example, the emergency mode may be automatically activated if a type of danger is a fire or an earthquake, scale of danger is information related to "strong", or a location of a mobile device is identical to a location where a danger occurs. For another example, the emergency mode 172 may be activated according to a user's input if a location of a mobile device is different from a location where a danger occurs even though a type of danger is a fire or an earthquake and scale of danger is information related to "strong".

Meanwhile, a mobile device which transitions to a warning mode 174 may set a flag related to warning mode status during predetermined time. The mobile device which transitions to the warning mode 174 determines that it is an emergency situation if network disconnection occurs on the warning mode status, and may output a pop-up display window indicating that the mobile device transitions to an emergency mode. The mobile device on the warning mode 174 may activate a menu for transitioning to an emergency mode on the warning mode status according to a user's input. For example, the menu for transitioning to the emergency mode may be set such that the menu is operated on deactivation status if the mobile device is not on the warning mode. For example, the warning mode 174 may be activated if a type of danger is heat wave, scale of danger is forewarning, and a location of the mobile device is different from a location where a danger occurs. According to an embodiment of the present disclosure, transitioning to an emergency mode or a warning mode in a mobile device may be performed or may not be performed according to default setting or a user's input.

If the mobile device receives emergency communication-related information transmitted through another user's mobile device according to request of the another user who senses an emergency situation, or receives the emergency communication-related information from a base station on a process of determining whether it is the emergency situation, the mobile device may operate as a temporary client for an emergency communication at operation 103 in FIG. 1a. In this case, the mobile device may receive emergency communication-related information transmitted from a device which is determined as a client or a base station, and response to request related to this. Here, the emergency communication-related information may include information related to coping with an emergency situation, a control command for an emergency communication, and/or the like. The control command may include information indicating only some functions for minimizing power consumption, and/or the like while an emergency communication is performed. This will be described below. Upon receiving emergency communication-related information according to another user's request from a base station, a mobile device may operate based on a timer mapped to the emergency communication-related information. For example, upon receiving a user input which corresponds to an activation command to an emergency mode which corresponds to the emergency communication-related information, the mobile device may transition to the emergency mode corresponding to the user input. It will be assumed that a user may not input the user input due to an emergency situation. The mobile device may automatically transitions to an emergency mode if the mobile device does not detect the user input until the timer expires. According to an embodiment, a mobile device which automatically transitions to an emergency mode may perform an operation of checking whether an emergency situation practically occurs for determining accuracy of transitioning to the emergency mode. If the emergency situation does not practically occur according to the checked result, the mobile device may release the automatically transitioned-emergency mode.

According to an embodiment of the present disclosure, if a mobile device determines to operate as a temporary client, the mobile device transitions to an emergency mode at operation 104. According to an embodiment of the present disclosure, the mobile device may activate only a connection function with a mobile communication network and a connection function with peripheral devices and deactivate other functions for minimizing power consumed for an emergency communication. A function of a mobile device on an emergency mode will be described with reference to FIGS. 2a and 2b. The mobile device checks whether there is another device with which the mobile device will perform an emergency mode. At this time, the another device is one of electronic devices which a user identical to a user of the mobile device has, or includes other users' electronic devices. A mobile device according to an embodiment of the present disclosure stores a list of devices which receive pairing previously, and may search for a device which may be currently connected to the mobile device among the devices included in the list or discover devices which may be currently connected to the mobile device using a device-to-device communication technology. Here, a device-to-device communication technology may perform a communication using, for example, Machine to Machine (M2M), Device to Device (D2D), Wi-Fi, zigbee, Bluetooth, and a multiple access scheme including a long-range communication scheme, and/or the like. Long term evolution (LTE), code division multiple access (CDMA), wideband code division multiple access (WCDMA), orthogonal frequency division multiplexing (OFDM), filter bank multi carrier (FBMC), non orthogonal multiple access (NOMA), sparse code multiple access (SCMA), and/or the like may be uses as the long-range communication scheme. For convenience of description, the specification exemplifies paring which is defined as a device-to-device connection operation with, for example, a Bluetooth function. However, a device-to-device connection operation according to an embodiment of the present disclosure may be performed using a combination of at least one of technologies which have been described above as well as Bluetooth, a short-range communication scheme, and a long-range communication scheme.

Figure 1B:
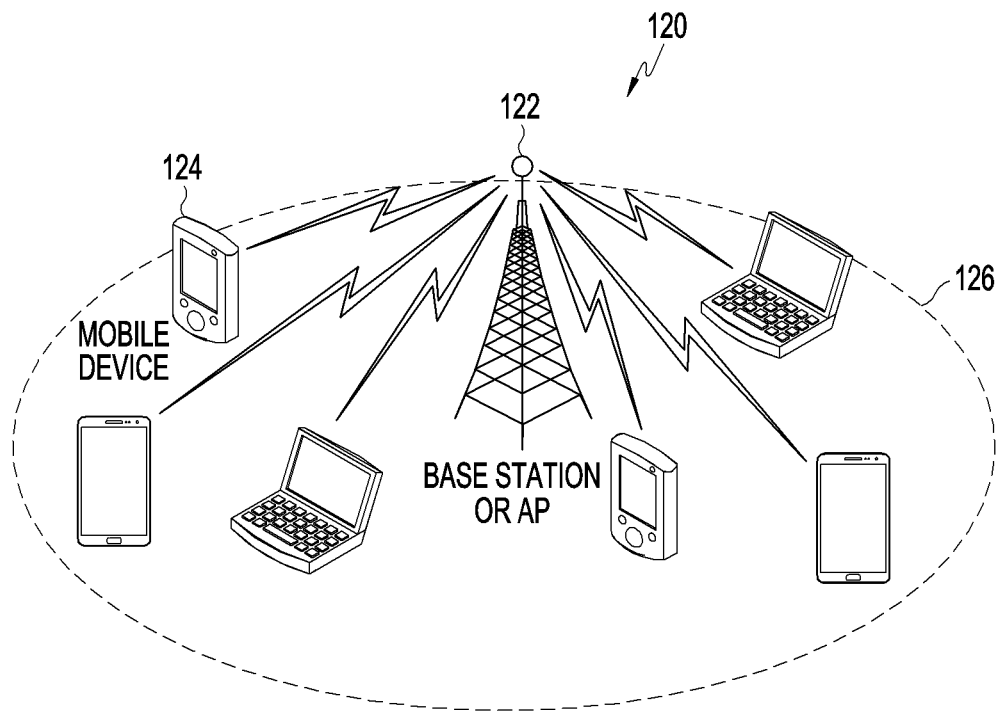
FIG. 1b illustrates an example of a network which may be used in a procedure of discovering pairing target devices according to an embodiment of the present disclosure.
Figure 1B:
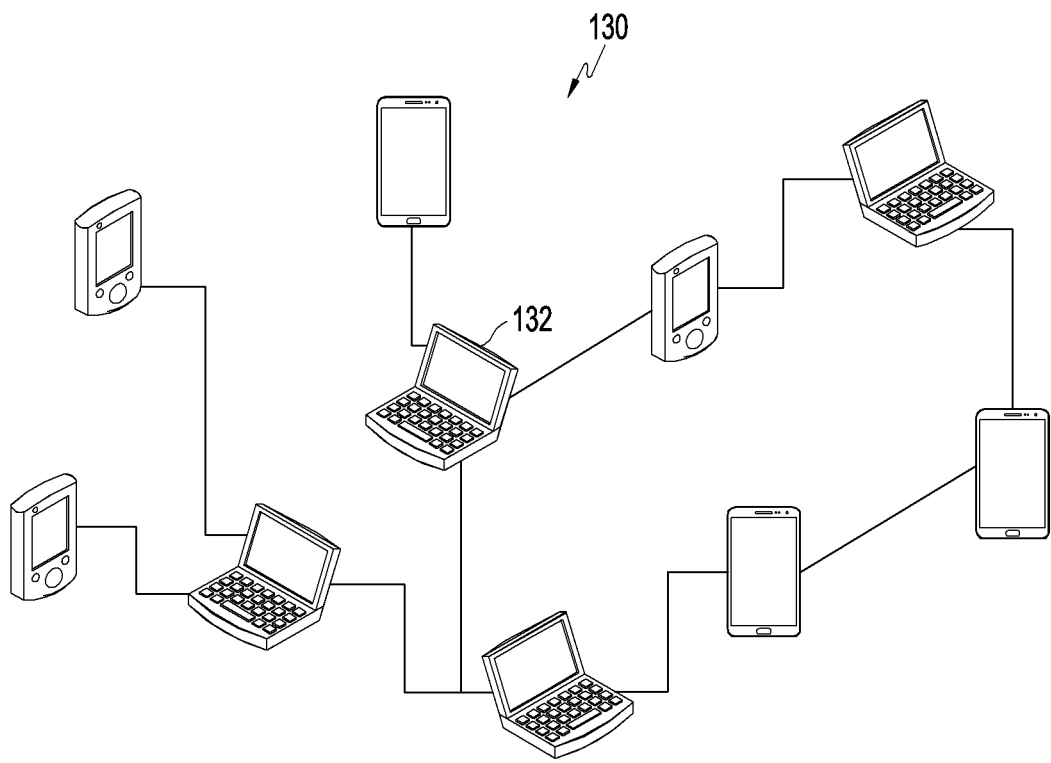
Figure 1C:
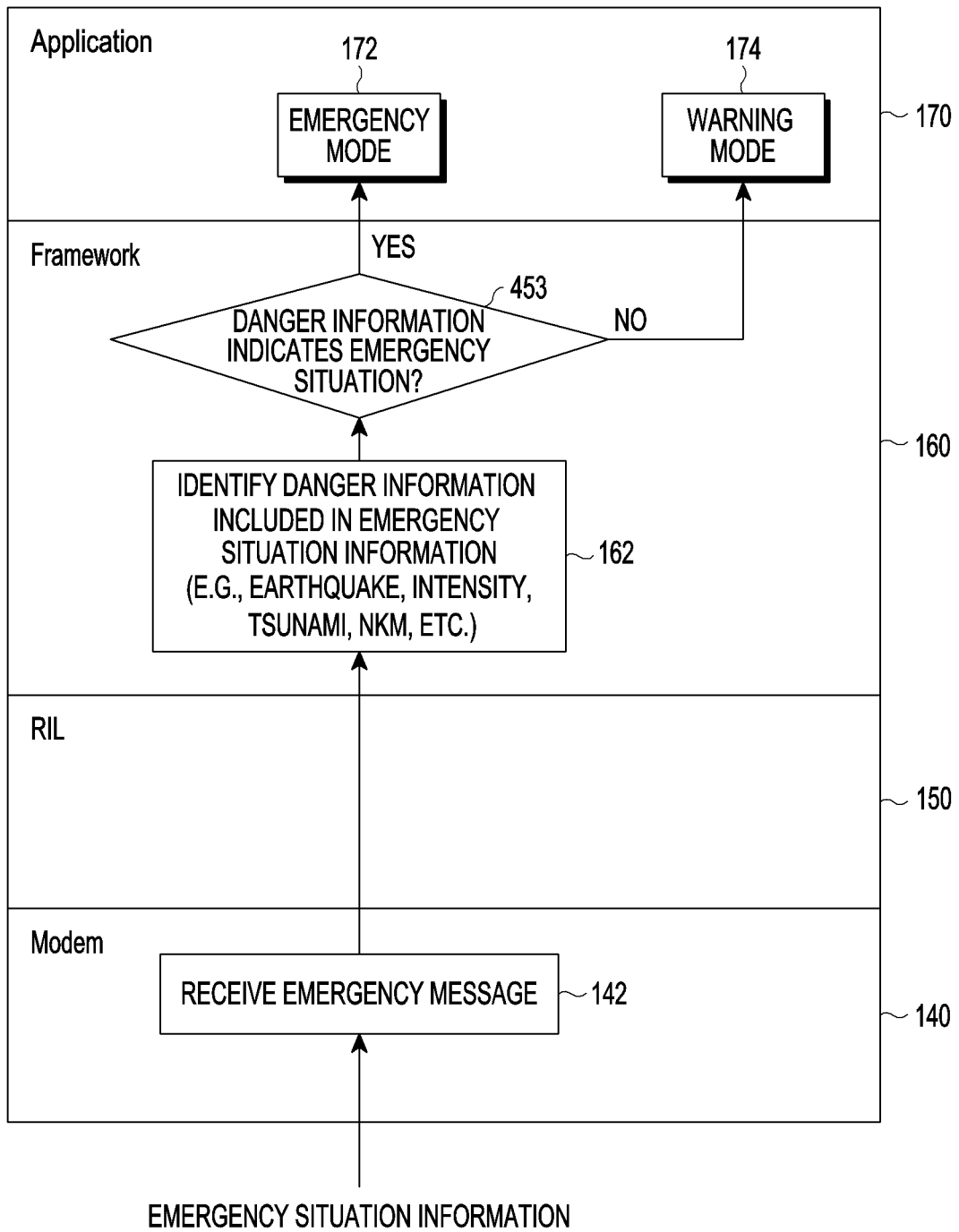
FIG. 1c is an example of an operation flowchart in which a mobile device determines an emergency situation and operates according to an embodiment of the present disclosure.

FIG. 1b illustrates an example of a network which may be used in a procedure of discovering pairing target devices according to an embodiment of the present disclosure.

Referring to FIG. 1b, a reference sign 120 indicates a case that a mobile device connects to a base station or an AP 122 which is installed at a specific place where the emergency situation occurs to broadcast a discovery signal for discovering devices located at a coverage 126 which the mobile device 124 supports, and selects a device which responds to the discovery signal as a pairing target. So, the mobile device maintains a connection with neighbor devices, and collects status information for an emergency communication at operation 106. In this case, the mobile device may request status information for an emergency communication from a peripheral device using an ad hoc scheme shown in the reference sign 120, and collect a response to this from the peripheral devices. The status information may include, for example, location information and an identifier of a device which receives the request, a user's name, a type, a function, and battery status of a device, a user's health status information, and/or the like. Here, the type of device, for example, may include a smart phone, a notebook, a wearable device, i.e., a smart watch, a Head mounted Display (HMD), a smart clothing, and/or the like. <Table 1> expresses an example of status information in a case that an earthquake occurs according to an embodiment of the present disclosure.

TABLE 1

| Classification | Device 1 | Device 2 | Device 3 |
| --- | --- | --- | --- |
| Battery | high | middle | low |
| GPS | o | o | x |
| Sensor | Terrestrial Magnetism Sensor | Acceleration Sensor | Heart Rate Sensor |
| Speaker | o | o | x |

Referring to <Table 1>, status information of each device may consist of, for example, battery status, whether a GPS is activated, whether there is a sensor module which may determine a user's health status, and whether a speaker is activated.

In a case that the base station or the AP which is installed at the specific place in advance may not perform a communication function due to an emergency situation, a mobile device may perform a connection procedure using an adhoc scheme as shown in a reference sign 130. In this case, a mobile device 132 may be paired through a direct connection with neighbor devices using a wireless interface, e.g., a Bluetooth function without a connection with a base station or an AP, collect information about target devices which are paired with the mobile device 132, and select a host for an emergency communication based on the collected information. In this case, the mobile device 132 may overcome a limitation to a communication distance, and/or the like which the wireless interface has using a multi hop routing function, and perform a communication using a node-to-node relay, and/or the like. The Bluetooth function used for the connection with the neighbor devices has been described as an example, however, the connection with the neighbor devices may be performed using another one of the short-range communication scheme, and the long-range communication schemes as described above, or using a combination of at least two of the short-range communication scheme and the long-range communication schemes.

The mobile device determines whether it is possible to access a mobile communication network, i.e., a base station at operation 108. A case that a base station or an access point (AP) which provides a mobile communication is destroyed due to the emergency situation may be assumed. In this case, the mobile device determines that it is impossible to access the mobile communication network, and proceeds to operation 110. In this case, in an embodiment of the present disclosure, since the access to mobile communication network is disconnected, so the mobile device may perform an emergency communication for rescue until it is possible to access an outer network. The mobile device finally determines a host which will control an emergency communication based on collected status information of peripheral devices, and transfers host indication information to a corresponding device if the determined host is not the mobile device. In this case, the mobile device transfers the collected status information per device such that the determined host may use this for generating control information. The mobile device transfers client indication information to remaining devices. According to an embodiment of the present disclosure, the mobile device generate control commands for an emergency communication for each of peripheral devices based on the collected information to transfer the control commands along with the indication information. An operation of finally determining a host, and control commands according to an embodiment of the present disclosure will be described with <Table 2> and FIG. 2c.

If it is possible to access the mobile communication network according to the determined result at operation 108, the mobile device proceeds to operation 112. The mobile device may transmit rescue request along with emergency situation notification information to a base station which is currently connected to the mobile device at operation 112. The mobile device transfers status information of the mobile device and the collected status information per device such that the base station determines a final host for an emergency communication. The base station determines a final host based on the status information per device and transfers host indication information to the determined host like at operation 110. An operation in a case that a base station has authority of determining a host will be described with FIG. 4b.

It will be assumed that a mobile device according to an embodiment of the present disclosure supports an emergency mode as described above, and a program or an application which is connectable with a server of an institute which supports emergency rescue is installed at the mobile device. According to this, if the mobile device transitions to an emergency mode, a program or an application related to the emergency communication is run, and may access a base station through the run program to transmit emergency situation notification information, rescue request, and/or the like. The emergency situation notification information may include status information about at least one of location information of a place where an emergency situation occurs, a situation of an accident or a disaster, a type of the mobile device, and battery status. For specific example, an emergency situation level such as a disaster, an accident, crime, and/or the like included in a menu which is preset on the program may be marked in the emergency situation notification information and the emergency situation notification information may be transmitted. Upon receiving the information notifying the emergency situation and the rescue request, the base station may transfer the information and the rescue request to a server of an institute which provides rescue from emergency situation, and receive emergency communication-related information received from the server to transfer the emergency communication-related information to the mobile device. So, the mobile device maintains only a function of accessing a mobile communication network for receiving information for emergency rescue from a base station and a function of connecting with neighbor devices, and deactivates remaining functions for minimizing power consumption at operation 114. Upon receiving the information for the emergency rescue from the base station, the mobile device transfers the information for the emergency rescue to peripheral devices and waits for rescue at operation 116.

Figure 2A:
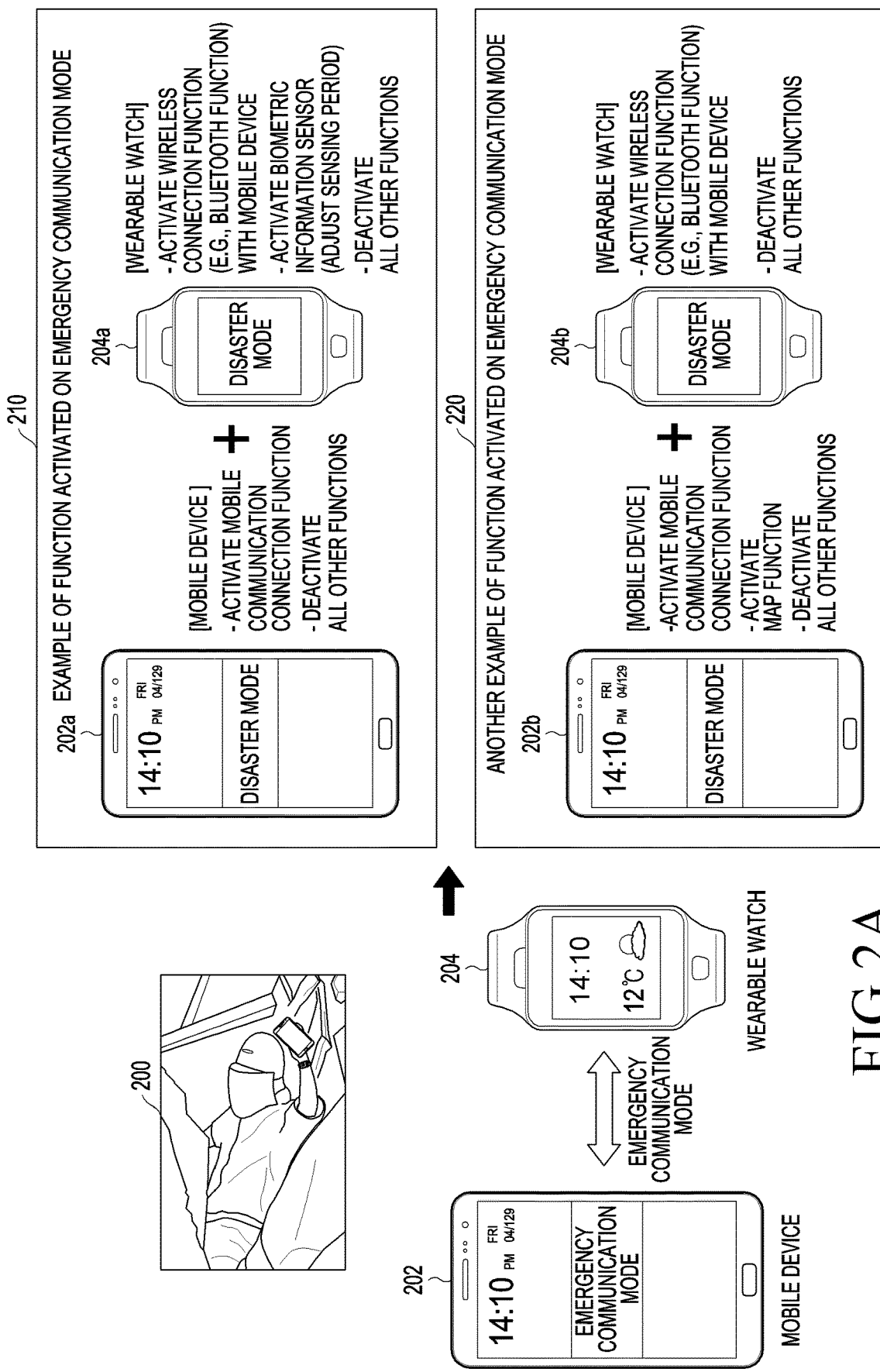
FIG. 2a is an example of a figure for describing an operation between a mobile device and a device which is paired with the mobile device on an emergency mode according to an embodiment of the present disclosure.

FIG. 2a is an example of a figure for describing an operation between a mobile device and a device which is paired with the mobile device on an emergency mode according to an embodiment of the present disclosure.

Referring to FIG. 2a, for convenience of description, it will be assumed that a mobile device 202a in FIG. 2a transitions to an emergency mode at operation 104 and is paired with a wearable watch 204a. In this case, a reference sign 210 indicates an example of a function which is activated at each of the mobile device 202a and the wearable watch 204a which are paired on the emergency mode. In a reference sign 210, the mobile device 202a transitioned to the emergency mode may operate by activating only a connection function with a mobile communication network, e.g., a 3G or Long Term Evolution (LTE) network for minimizing consumed power, and deactivating all other functions. The wearable watch 204a paired with the mobile device 202a also transitions to an emergency mode under a control of the mobile device 202a. According to an embodiment of the present disclosure, a device paired with a mobile device transitioned to an emergency mode may additionally operate some functions as well as a connection function with the mobile device. For example, it will be assumed that a user of the mobile device 202a needs to check periodic health state. In this case, the wearable watch 204a may activate only a connection function, for example, a Bluetooth function with the mobile device 202a, and activate a sensor for measuring user's biometric information. In this case, a period of the sensor may be adjusted according to a compared result between user's biometric information which is currently measured and a threshold value. For example, if the user's biometric information is equal to or greater than the threshold value, the period of the sensor may be set to a period which is longer than a currently set period for minimizing power consumption for preparing a situation that rescue for a user becomes long. If the user's biometric information is less than the threshold value, there is high probability that user's health status becomes bad, so the period of the sensor may be set to a period which is shorter than the currently set period. In this case, an alarm indicating that the user's health status is bad may be transferred to the mobile device 202a. The mobile device 202a may transfer the alarm to a base station or a rescuer to request that fast rescue is performed.

A reference sign 220 indicates another example of a function which is activated at a paired mobile device and wearable watch on an emergency mode. In a reference sign 220, a mobile device 202b transitioned to an emergency mode activates a connection function with a mobile communication network, e.g., a 3G or Long Term Evolution (LTE) for minimizing consumed power. If the mobile device 202b operates as a host device for an emergency communication, a map function may be activated for providing a rescuer with a location of the mobile device 202b through the host device. The map function may also provide a location of a paired wearable watch 204b. The mobile device 202b may operate all other functions as deactivated status.

The wearable watch 204b paired with the mobile device 202b may transition to a sleep mode, activate only a connection function, e.g., a Bluetooth function, for communication with the mobile device 202b, and deactivate other remaining functions. Functions which are activated and deactivated on a wearable device paired with a mobile device transitioned to an emergency mode have been described as an example in FIG. 2a, however, minimum other functions related to an emergency communication may be activated while minimizing consumed power of a corresponding device.

Figure 2B:
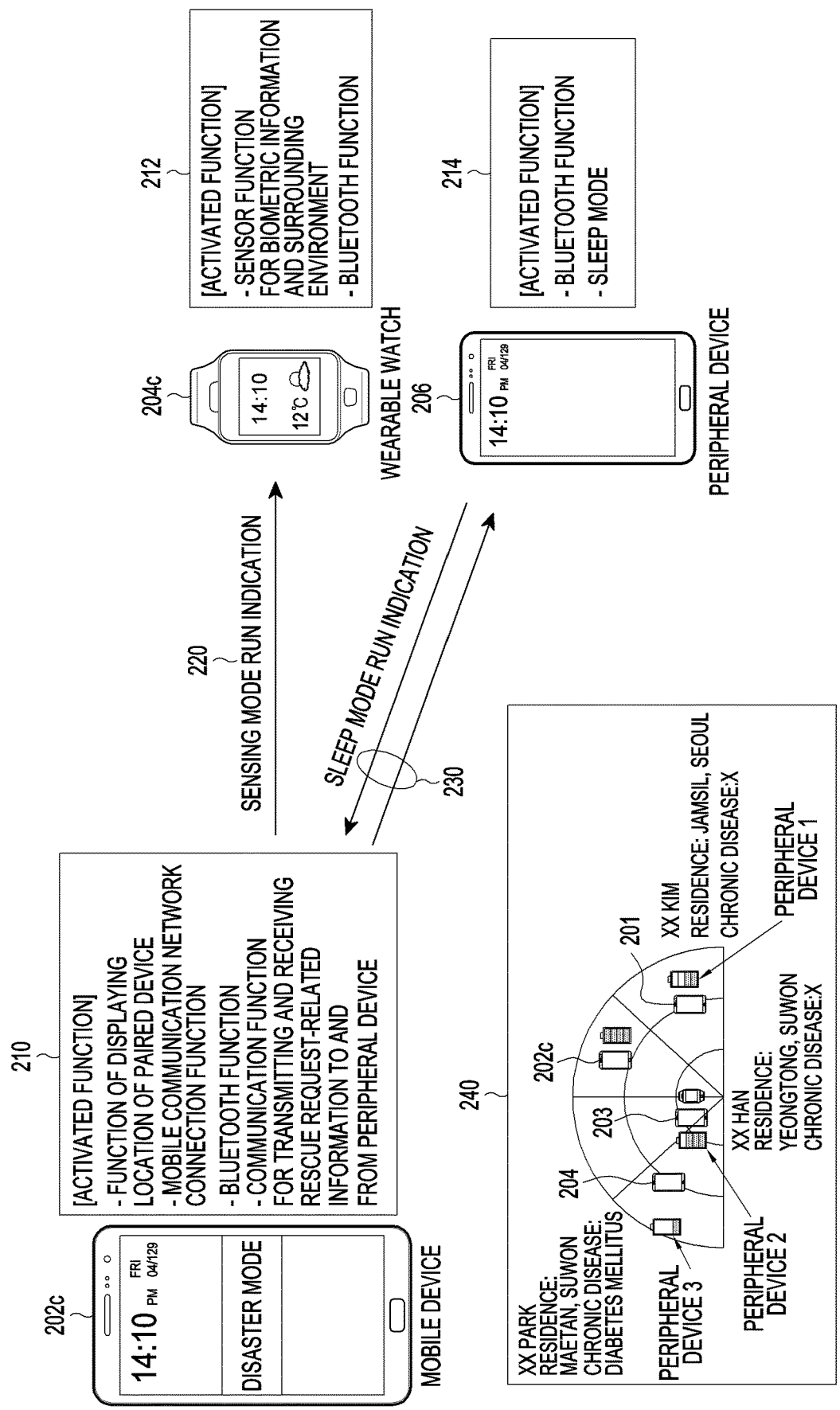
FIG. 2b is an example of a figure for describing an operation of a mobile device which is determined as a temporary host or a final host according to an embodiment of the present disclosure.

FIG. 2b is an example of a figure for describing an operation of a mobile device which is determined as a temporary host or a final host according to an embodiment of the present disclosure. For convenience of description, it will be assumed that a mobile device 202c in FIG. 2b transitions to an emergency mode to be paired with another device, e.g., a wearable watch 204c, and the mobile device 202c operates as a temporary host or a host which is finally determined.

Referring to FIG. 2b, a case is illustrated that a mobile device 202c activates, on an emergency mode as shown as a reference sign 210, only a function for displaying a location of a paired device, a function for connecting to a mobile communication network, a wireless connection function, e.g., a Bluetooth function with the wearable watch 204c, and a communication function for transmitting and receiving rescue request-related information to a peripheral device. In this case, the mobile device 202c which operates as a host may be paired with the wearable watch 204c through the Bluetooth function to run a sensor function for measuring a user's biometric information and a surrounding environment at operation 220. According to this, the wearable watch 204c activates only a sensor for measuring a user's biometric information and a surrounding environment and a Bluetooth function according to a user's characteristic as shown in a reference sign 212.

The mobile device 202c may transfer rescue request-related information received from an outer network to a peripheral device 206, or sense an incoming signal from the peripheral device 206 at operation 230. In this case, the peripheral device 206 activates only a Bluetooth function for a connection with the mobile device 202c and operates on a sleep mode as shown at a reference sign 214. According to this, the peripheral device 206 maintains an idle state while waiting for a signal received from the mobile device 202c to minimize consumed power.

According to an embodiment of the present disclosure, a mobile device 202c which operates as a temporary host or a finally determined host may perform an operation of collecting status information for other neighbor devices as well as a neighbor device 214 to store status information of rescue target devices which are on an emergency situation. A neighbor device according to an embodiment of the present disclosure corresponds to devices which are located within a distance within which communication with a corresponding mobile device is possible. For example, if the mobile device is connected to a neighbor device with a Bluetooth function, the neighbor device may correspond to devices which are located within a communication range within which the Bluetooth function of the mobile device may be applied, for example, within a radius from the mobile device. According to another embodiment, a communication range which may be used for determining a neighbor device may be varied according to a communication function used in the mobile device. For example, as shown at a reference number 240, it will be assume that there are another user's three peripheral devices 201, 203, and 204 with which the mobile device 202c may connect. A case that information obtained from status information is, for example, a name, an address, a chronic disease, and a battery information for a user of each device is shown here. Here, the status information is just an example, and the status information may further include other information as well as the information and may consist of some of the listed information.

At a reference sign 240, a case that the mobile device 202c of which battery charge status is best among devices located at an area where an emergency situation occurs operates as a host has been described as an example. According to another embodiment, if the area where the emergency situation occurs is in water, a device which supports a waterproof function among the devices may operate as a host. That is, according to an embodiment of the present disclosure, information obtained from channel status information may have a priority which is varied according to an emergency situation. In an embodiment of the present disclosure, a mobile device which operates as a temporary host may select a final host by considering at least one of information obtained from status information collected from peripheral devices. Status information according to an embodiment of the present disclosure may include, for example, location information and an identifier of the device which receives the request, a user's name, a type, function, and battery status of a device, the user's health status information, and/or the like. For another example, assuming that a communication connection with a base station is possible, a mobile device which is closest to the base station may operate as a final host since the mobile device may minimize power consumption when communicating with the base station. For another example, assuming that the communication connection with the base station is impossible, if only devices which are connected on an emergency mode communicate, a host may be determined based on an algorithm in FIG. 2c. Similarly, in a situation that a communication connection with a base station is possible, a host may be determined based on an algorithm in FIG. 2c. According to another embodiment, a device which transitions to an emergency mode first, or a device which transmits an emergency communication request to a base station first may be set as the first host regardless of whether it is connected to the base station. Further, a host may be selected except for devices which automatically transition to an emergency mode.

<Table 2> is an example of a table which lists functions which a mobile device supports among status information per device collected by the mobile device operating as a temporary host.

TABLE 2

| Function | User A (Smart Phone) | User B (Watch) | User C (Feature Phone) |
| --- | --- | --- | --- |
| Biometric Information Sensing | 1 | 1 | 0 |
| Disaster information Providing (FM chip) | 1 | 1 | 0 |
| GPS | 1 | 1 | 1 |
| Wi-Fi | 1 | 1 | 1 |
| BT(BLE) | 1 | 1 | 1 |
| LTE | 1 | 0 | 0 |
| 3G | 1 | 1 | 1 |
| Zeebee | 0 | 1 | 0 |
| Sum | 7 | 7 | 4 |

An example of a case that a function per device is considered when a host is selected according to an embodiment of the present disclosure is shown in <Table 2>. Functions which a mobile device may support include, for example, functions for sensing biometric information, providing disaster information, a Global positioning system (GPS), and a wireless connection, for example, Wi-Fi, BlueTooth (BT), LTE, 3G, zigbee, and/or the like. In this case, it will be assumed that a temporary host indicates functions which each user supports from status information of each of a user A's smart phone, a user B's a wearable watch, and a user C's feature phone as shown in Table 1. In this case, the number of functions which the user A may support is equal to the number of functions which the user B may support, and the number of functions which the user A may support and the number of functions which the user B may support are larger than the number of functions which the user C may support, so the temporary host may consider additional information for determining a final host.

FIG. 2c is an example of a figure for describing an operation of determining a final host according to an embodiment of the present disclosure.

Referring to FIG. 2c, an operation of determining a final host may be determined by a mobile device which transitions to an emergency situation mode and operates as a temporary host, or a base station which receives authority for determining a host from the mobile device. For convenience of description, a case that a mobile device which operates as a temporary host determines a final host will be described as an example. An operation at which a temporary host determines a final host by considering all of a device type, battery amount, a function, the number of connected devices, and a location among information obtained from channel status of peripheral devices are shown. For example, it will be assumed that there are three devices connected to the candidate host.

A type of the first device is a smart phone, a type of the second device is a wearable watch, and the third device is a smart phone. In this case, a device which has more functions for an emergency communication may be usefully used upon an emergency communication, so the first device and the third device which may perform more functions compared to the second device may be selected as a candidate of a host. Next, if battery amount is sufficient, an emergency communication may be maintained until rescue, so the more sufficient the battery amount is, the higher a probability that it may be selected as a host is. So, the third device of which battery amount is most sufficient among the first to the third devices may be selected as a candidate. In a case of a function, in common with a type of device, the temporary host may select the first device and the second device of which the number of functions is largest as a candidate of a host. Further, a corresponding device of which the number of devices connected to the corresponding device is large among the first to the third devices may perform an emergency communication while minimizing power consumption. So, the temporary host may select the first device which has a device connected to the first device among the first to the third devices as a candidate of a host.

Finally, a temporary host may select a candidate device by considering location information per device. The first device which has been most selected among candidates selected according to a type, battery amount, a function, the number of connected devices, and a location of each device is determined as a final host. <Table 2> and FIG. 2c have been described as just an example of a host selecting operation according to an embodiment of the present disclosure. A host according to an embodiment of the present disclosure may be determined based on at least one information which has a high priority by determining a predetermined priority for each of information included in status information obtained by a temporary host. Here, the priority may be varied according to a corresponding emergency situation.

Figure 2D:
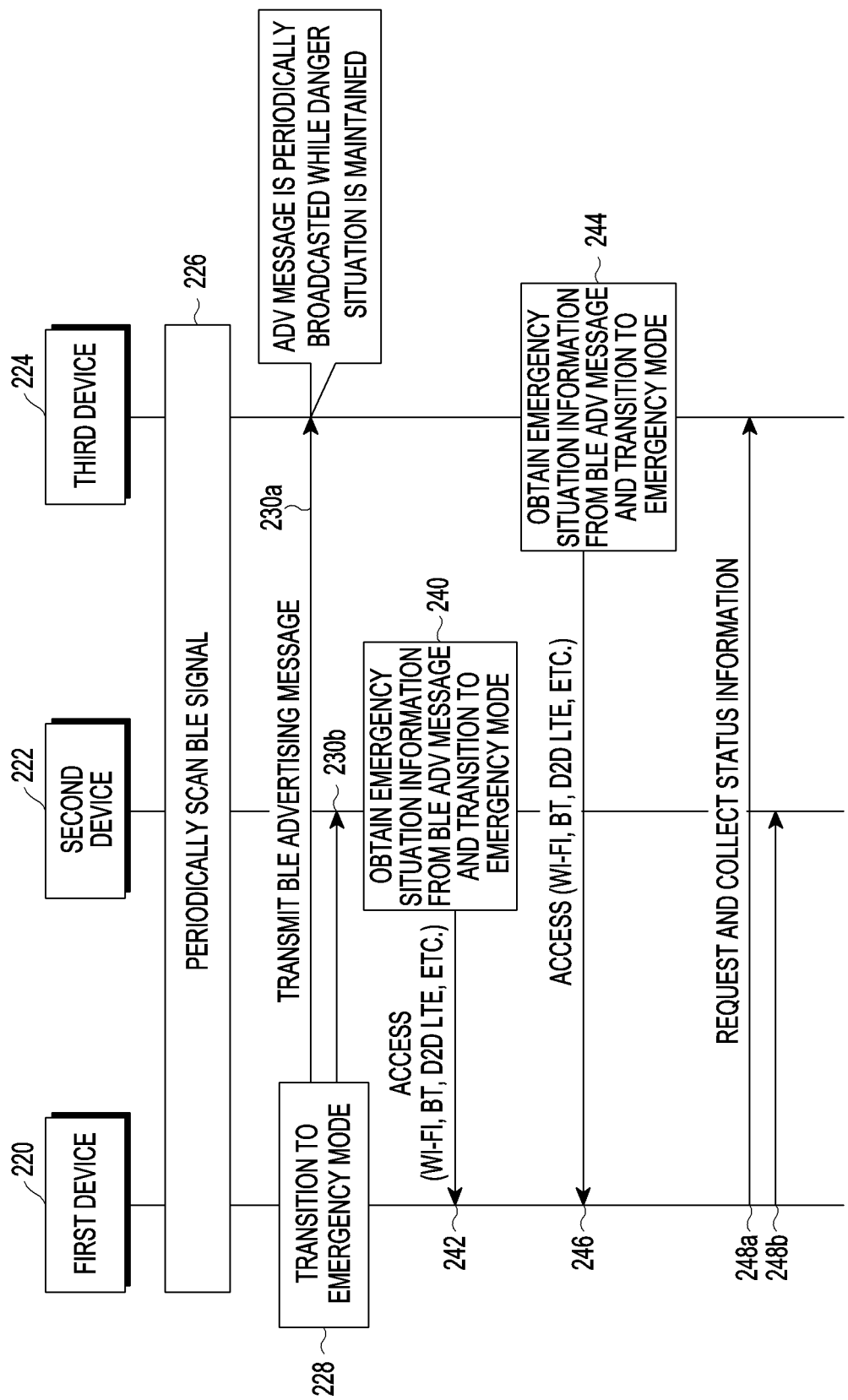
FIG. 2d is an example of an operation flowchart of a mobile device which is determined as a host according to an embodiment of the present disclosure.

FIG. 2d is an example of an operation flowchart of a mobile device which is determined as a host according to an embodiment of the present disclosure. For convenience of description, it will be assumed that the first device 220 receives emergency situation information and transitions to an emergency mode as described in FIG. 1c. Further, it will be assumed that the first device transitions to the emergency mode first, so the first device operates as a temporary host. It will be assumed that the first device 220 performs a connection with neighbor devices which may communicate using a Bluetooth function. At this time, the neighbor devices are devices which exist at a location at which a Bluetooth communication is possible based on the first device 220, and may be a peripheral device which a user of the first device has or may be another user's device as described in FIG. 3.

Referring to FIG. 2d, for example, the first device 220 periodically scans a Bluetooth Low Energy (BLE) signal for discovering a connectable device at operation 226. So, the first device 220 recognizes a situation that a Bluetooth Low Energy (BLE) connection with the second device 222 and the third device 224 is possible.

Further, it will be assumed that the first device 220 receives emergency situation information and transitions to an emergency mode at operation 228. An operation of transitioning to the emergency mode in the first device 220 has been described above, so a detailed description will be omitted herein. The first device 220 periodically sets a BLE advertising message for notifying each of the second device 222 and the third device 224 of an emergency situation at operations 230a and 230b. A value which is set as default may be used as a period by which the BLE advertising message is transmitted, or the period by which the BLE advertising message is transmitted may be randomly adjusted by a user according to a current situation.

Figure 2E:
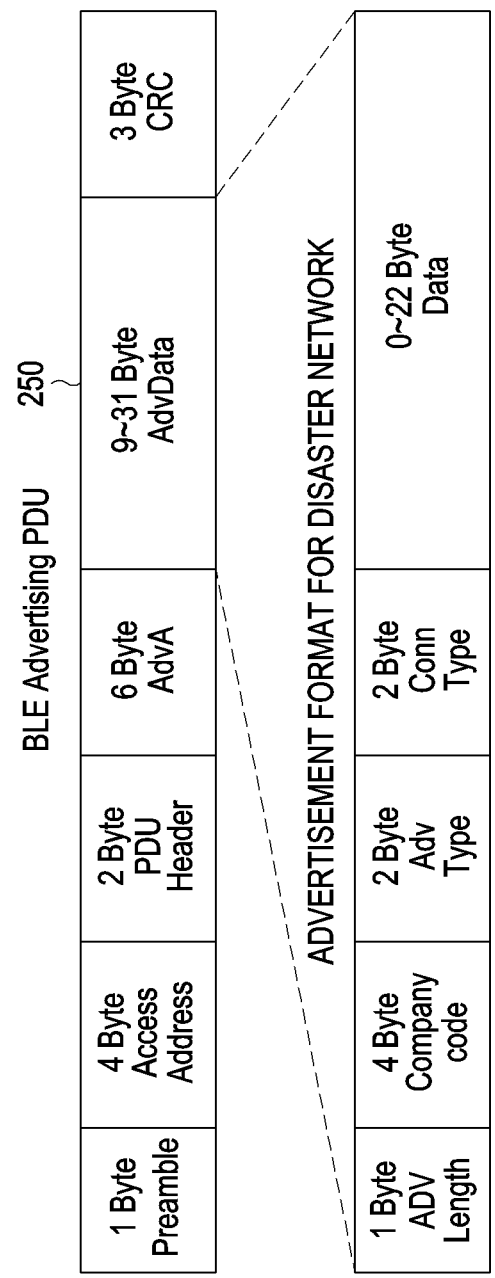
FIG. 2e is an example of a configuration of a BLE advertising message according to an embodiment of the present disclosure.

FIG. 2e is an example of a configuration of a BLE advertising message according to an embodiment of the present disclosure.

Referring to FIG. 2e, a BLE advertising message according to an embodiment of the present disclosure may consist of, for example, a preamble implemented with one byte, a source of the BLE advertising message implemented with four bytes, i.e., an access address of the first device 220, a header implemented with two bytes of a packet data unit (PDU) which corresponds to the message, data 250 which may be implemented with 9~31 bytes, a Cyclic Redundancy Checking (CRC) code implemented with 3 bytes, and/or the like. The data 250 consists of information for notifying an emergency situation. For example, a length of one byte, a company code of four bytes, a connection type of two bytes, a connection type of two bytes, and data which may consist of 0~22 bytes may be included. Here, the company code and the type of two bytes may indicate information indicating an emergency situation, and the connection type may declare a type of a network which will connect with the first device 200. The network type may indicate, for example, at least one of Wi-Fi, Bluetooth, and device to device (D2D) LTE. Finally, an identifier which may be accessed per network type is included in the data. Assuming that a network type is Wi-Fi, an Access Point (AP) which provides a Wi-Fi network, a password, Internet Protocol (IP) information, and/or the like may be included.

Upon receiving the BLE advertising message, each of the second device 222 and the third device 224 obtains emergency situation information from the BLE advertising message and transitions to an emergency mode at operation 240 and operation 244. Each of the second device 222 and the third device 224 is connected to the first device 220 using obtained access information at operation 242 and operation 246.

After sensing the connections of the second device 222 and the third device 224, the first device 220 may request status information from each of the second device 222 and the third device 224 to collect the status information at operations 248a and 248b.

Figure 3:
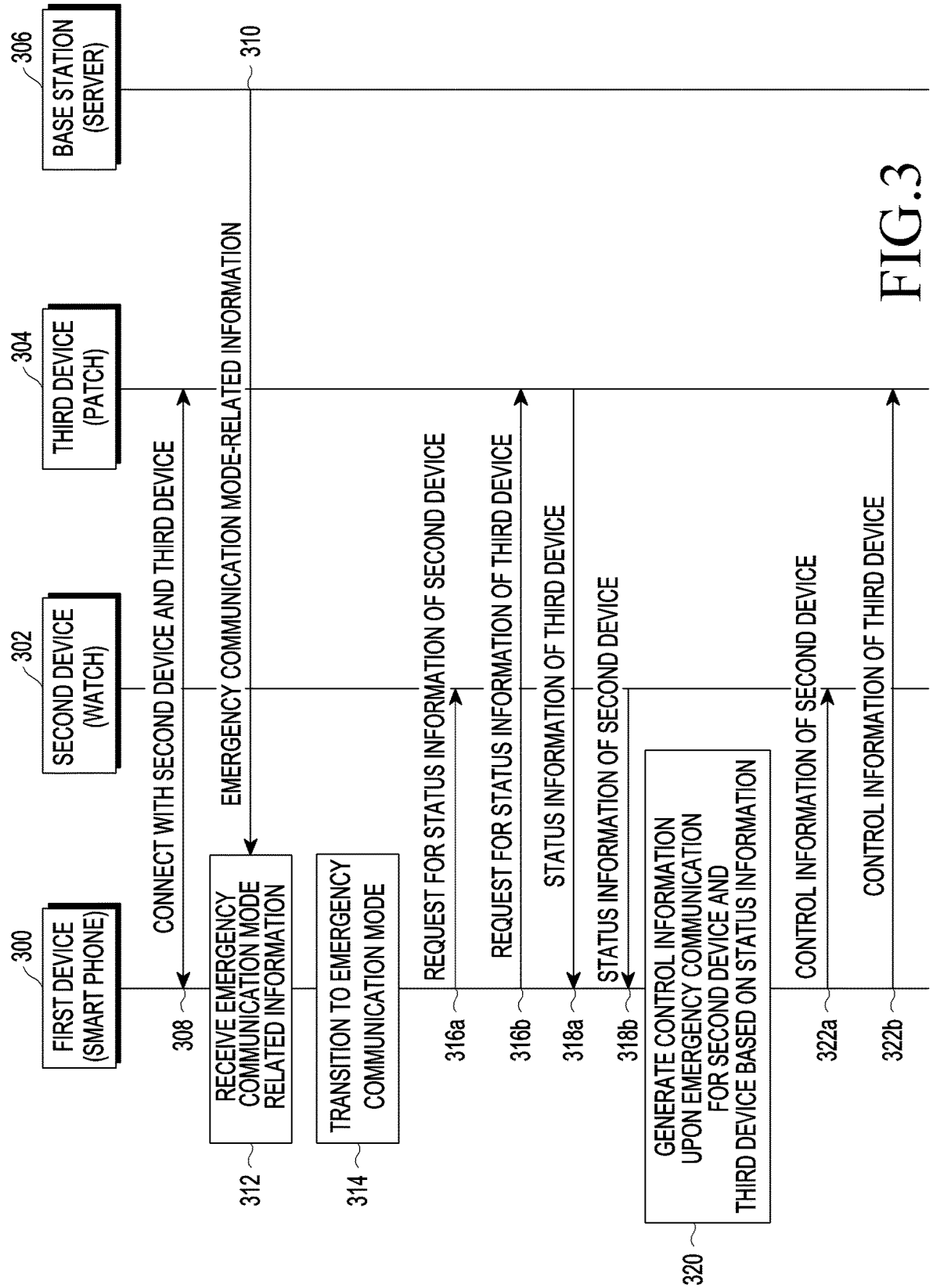
FIG. 3 is an example of an operation flowchart in which an emergency communication is performed using the same user's devices according to an embodiment of the present disclosure.

FIG. 3 is an example of an operation flowchart in which an emergency communication is performed using the same user's devices according to an embodiment of the present disclosure.

Referring to FIG. 3, it will be assumed that a user of the first device 300 connects to other devices which the user has, e.g., the second device 302 and the third device 304 and communicates with the other devices. It will be assumed that the second device 302 is a wearable device, and the third device 304 is a smart patch which performs a specific function. The first device 300, the second device 302, and the third device 304 are connected with a scheme as described in FIG. 2e, so a detailed description will be omitted.

It will be assumed that the first device 300 receives emergency situation-related information from a base station 306 while the first device 300 connects to the second device 302 and the third device 304 and communicates with the second device 302 and the third device 304 at operation 310. In this case, an emergency situation occurs at a place where a user of the first device 300 exists, a server of an institute which supports emergency rescue for the emergency situation in connection with the place notifies the base station 306 of the emergency situation for the place, and the base station 306 may broadcast activation request to an emergency mode to devices which are located at the place. Alternatively, according to an embodiment, the base station 306 may receive information for notifying an emergency situation from another user's device which is located at the same location as a user of the first device 300 and transfer the information to the server, receive an emergency situation from the server, and broadcast activation request to an emergency mode to devices which are mapped to notified emergency situation. Alternatively, according to an embodiment, a user at the outside recognizes that an emergency situation occurs at the place and notifies the server of the occurrence of the emergency situation, and may request that activation request to an emergency mode may be broadcasted to corresponding devices through the server. In FIG. 3, for example, the first device 300 which receives the emergency situation-related information from the base station 306 transitions to an emergency mode at operation 314. After transitioning to the emergency mode, the first device 300 maintains minimum functions for an emergency communication and deactivates remaining functions for minimizing power consumption for the emergency communication as described in FIGS. 2a and 2b. For example, only a connection function with a mobile communication network may be activated for receiving the emergency situation-related information from the base station 306. The first device 300 may decrease power consumption for corresponding functions by performing separate functions required in an emergency situation through the second device 302 and the third device 304 which are currently connected to the first device 300, so the first device 300 may activate a connection function with a peripheral device. For this, the first device 300 requests status information from each of the second device 302 and the third device 304 at operations 316a and 316b. The second device 302 and the third device 304 generate status information requested by the first device 300 and transfer the status information to the first device 300 at operation 318. Here, status information is generated in the same manner as described above, so a detailed description will be omitted herein.

The first device 300 generates a control command for indicating functions to be activated at a corresponding device based on the status information received from each of the second device 302 and the third device 304 at operation 320. <Table 3> shows an example of a control command generated in the first device 300.

TABLE 3

| Classification | Activated Function | Deactivated Function |
|---|---|---|
| Device 1 | Communication Function | GPS |
| Device 2 | GPS and Connection Function | Acceleration Sensor |
| Device 3 | Heart Rate Sensor and Wireless Connection Function | Remaining Functions |

For example, a control command for the second device 302 to activate a GPS function and a wireless connection function and deactivate remaining functions may be generated such that a user's location information may be provided to a rescuer if necessary. A control command for the third device 304 to activate a sensor for sensing a user's biometric information and a wireless connection function and deactivate remaining functions may be generated such that a user's health status may be provided to a rescuer if necessary. The control command has been described as an example. In a case that an emergency communication is maintained during a long period, battery status of a corresponding device is continuously checked, and control information may be generated as a form in which additional functions are minimized or by combining whether to activate functions other than the additional functions and whether to deactivate the functions other than the additional functions according to battery charging status. The first device 300 transmits control information of the second device to the second device 302 at operation 322a, and transmits control information of the third device to the third device 304 at operation 322b.

Figure 4A:
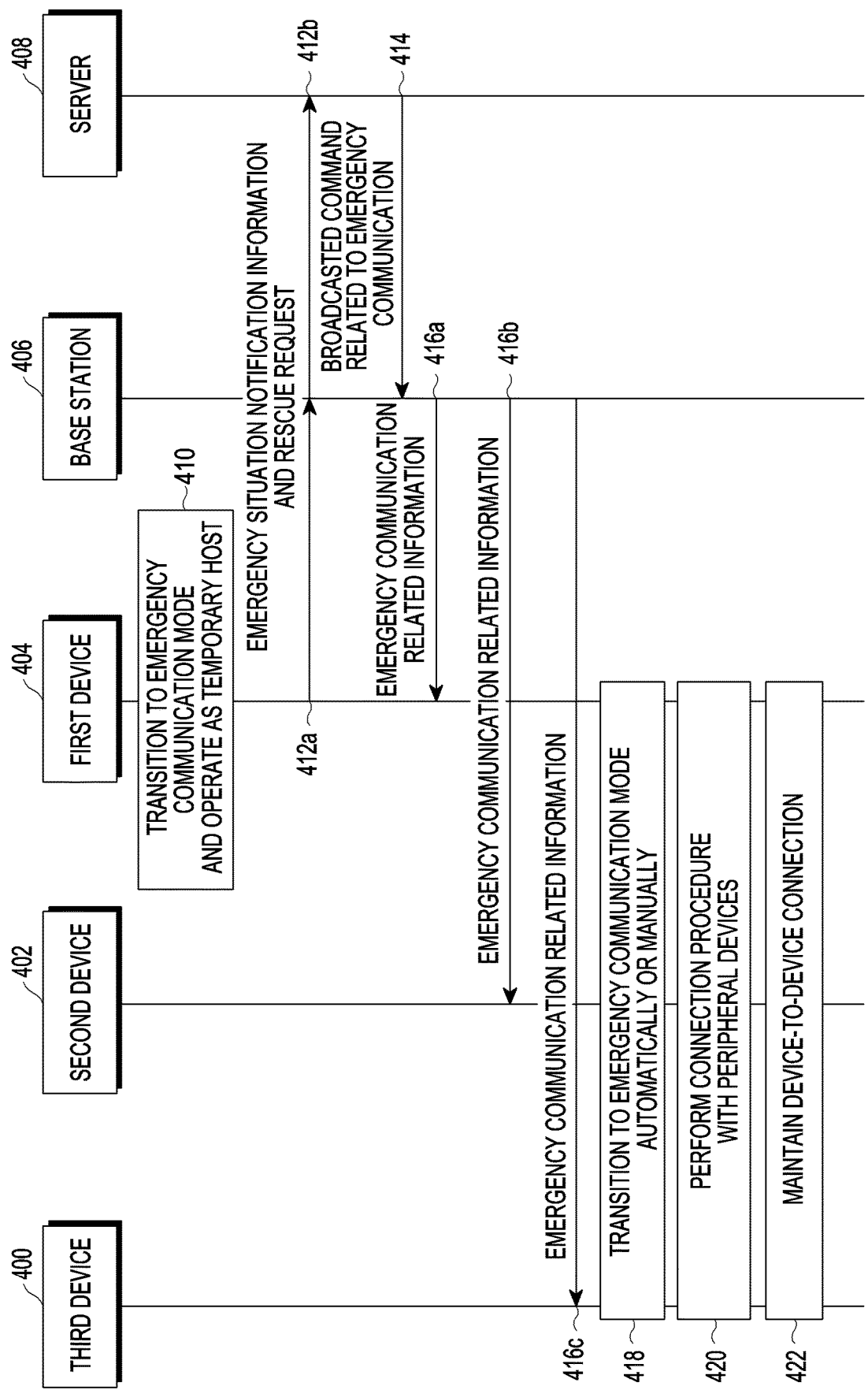
FIG. 4a is an example of an operation flowchart in which a device which is operating as a temporary host performs an emergency communication with another user's devices in according to an embodiment of the present disclosure.

FIG. 4a is an example of an operation flowchart in which a device which is operating as a temporary host performs an emergency communication with another user's devices in according to an embodiment of the present disclosure.

Referring to FIG. 4a, the first device 404 transitions to an emergency mode at operation 410. At this time, it will be assumed that the first device 404 transitions to the emergency mode through a sensor module equipped in the first device 404 or a user's sensing. In this case, although not shown, the first device 404 may minimize power consumption by performing a connection procedure with other devices of the first device 404 as described in FIG. 3. The first device 404 determines whether it is possible to connect to a base station 406 for rescue request for an emergency situation. If it is possible to connect to the base station 406 according to the determined result, the first device 404 transmits rescue request along with emergency situation notification information which is currently sensed at operation 412a. Here, emergency situation notification information is generated as the same as emergency situation notification information at operation 112, and a detailed description will be omitted. Upon receiving the emergency situation notification information and the rescue request, the base station 406 transfers the emergency situation notification information and the rescue request to a server 408 of an institute which supports coping, rescue, and/or the like upon an emergency situation at operation 412b. The server 408 identifies a location at which an emergency situation occurs and a kind of the emergency situation included in the received emergency situation notification information, and transfers, to the base station 406, a command to broadcast emergency communication-related information including a rescue countermeasure for handing the emergency situation and related information to devices which exist at a location at which the emergency situation occurs. Upon receiving the command, the base station 406 broadcasts the emergency communication-related information received from the server 408 to the devices which exist at the location at which the emergency situation occurs at operations 416a to 416c. Upon receiving the emergency communication-related information from the base station 406, each of the second device 402 to the third device 400 transitions to an emergency mode. Here, emergency communication-related information according to an embodiment of the present disclosure may be mapped to a predetermined response time timer such that a device which receives the emergency communication-related information may transition to an emergency mode to perform an emergency communication with peripheral devices for rescue. A device which transmits a response to the base station 406 within the timer among the second device 402 to the third device 400 transitions to an emergency mode. For a case that a user is unconscious or suffer from a situation in which the response may not be transmitted, a corresponding device may automatically transitions to an emergency mode when emergency communication-related information according to an embodiment of the present disclosure is received even though a user input which corresponds to activation request to the emergency mode is not sensed within the timer. According to another embodiment, a user may cause a corresponding device to transition to an emergency mode when an emergency situation is sensed through a sensor for sensing the emergency situation even though the corresponding device does not receive emergency communication-related information from the outside. Emergency communication-related information according to an embodiment of the present disclosure may be generated as a form of a text message including uniform resource locator (URL) information connectable to an emergency mode, and/or the like.

Each of the first device 404 to the third device 400 performs a discovery procedure for connections with a peripheral device for an emergency communication to perform a connection procedure with connectable devices at operation 420, and maintains connection status at operation 422. Here, a connection procedure among the first device 404 to the third device 400 is performed in the same manner as a scheme in FIG. 2e, and a detailed description will be omitted herein.

Figure 4B:
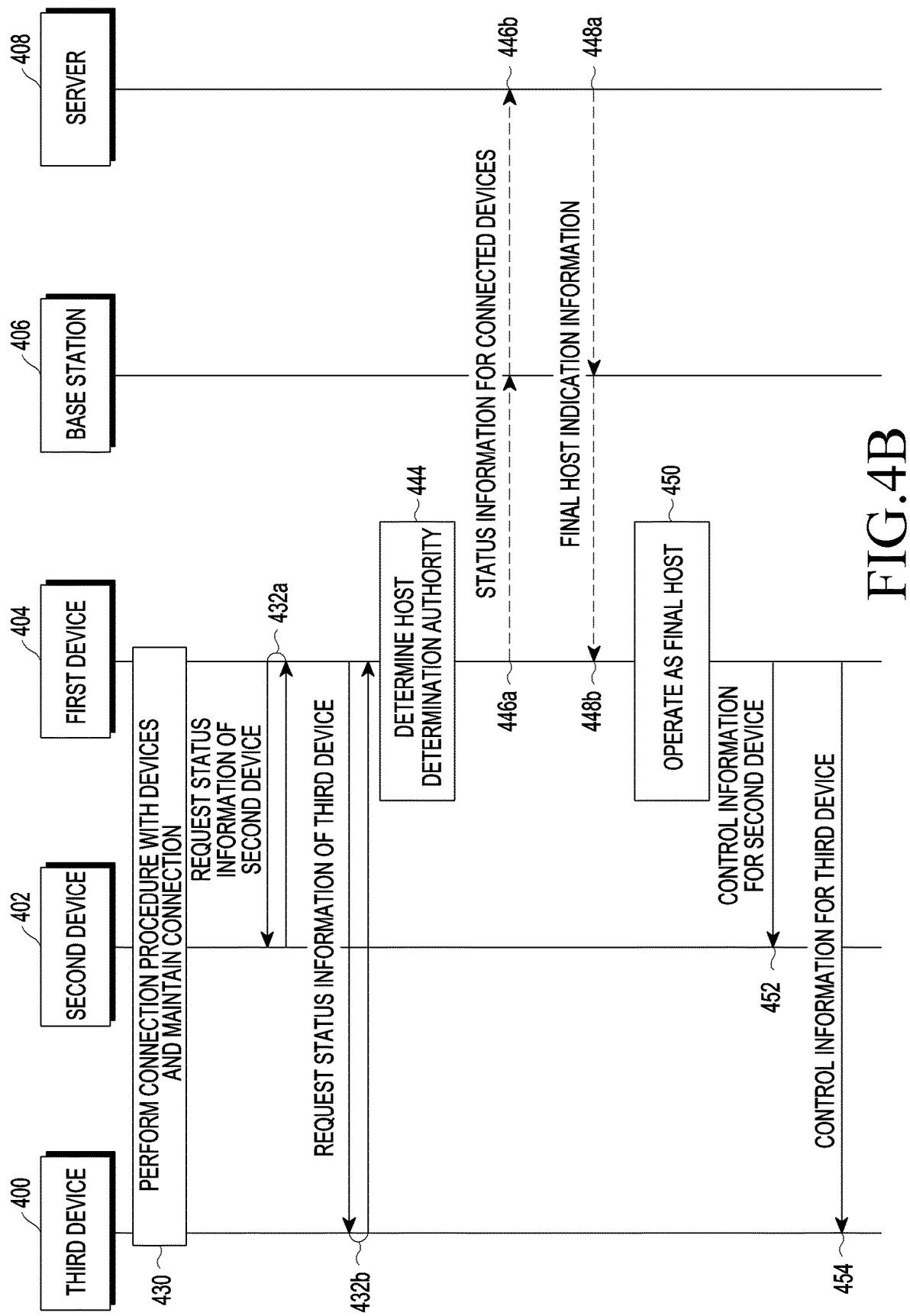
FIG. 4b is an example of an operation flowchart in which a final host for an emergency communication is determined and the final host operates according to an embodiment of the present disclosure.

FIG. 4b is an example of an operation flowchart in which a final host for an emergency communication is determined and the final host operates according to an embodiment of the present disclosure.

Referring to FIG. 4b, for convenience of description, it will be assumed that each of the first device 404 to the third device 400 transitions to an emergency mode through an operation in FIG. 4a and maintains a connection for an emergency communication with another user's devices which are adjacent to each of the first device 404 to the third device 400 at operation 430. Currently, the first device 404 which recognizes an emergency situation first is operating as a temporary host, so the first device 404 transmits status information request to the second device 402 connected to the first device 404 and receives status information of the second device 402 at operation 432a. Similarly, the first device 404 transmits status information request to the third device 400 and receives status information of the third device 400 at operation 432b. Here, status information has been described above, so a detailed description will be omitted. The first device 404 determines whether to have host determination authority according to whether the first device 404 may currently connect to a base station 406 at operation 444. If the first device 404 is capable of connecting to the base station 406, the first device 404 transfers the collected status information of the devices through the base station 406 at operations 446a and 446b. The server 408 determines a device to be operated as a final host upon an emergency communication based on the status information of each of the first device 404 to the third device 400. In an operation of determining a final host, a device which has a predetermined priority or status information suitable for a current emergency situation may be determined as the final host based on the status information of the devices as described in <Table 1> and FIG. 2c. The server 408 transfers host indication information to a device which corresponds to a determined final host through the base station 406. It will be assumed that the first device 404 is determined as a final host. The server 408 transfers host indication information to the first device 404 through the base station 406 at operations 448a and 448b. If another device, not the first device 404, is determined as a final host, the first device 404 transfers the host indication information to a corresponding device. The first device 404 operates, at operation 450, as a host, and generates a control command for a corresponding device during an emergency communication based on the status information of the devices collected at operations 432a to 432b. For example, a biometric information sensing function for sensing a user's health status may be activated if it is determined that a user of the second device 402 has a chronic disease or the user is hurt through the status information of the second device 402. For another example, a control command may be generated such that the third device 400 activates only a wireless connection for an emergency communication with the first device 404. The first device 404 transmits a control command for the second device to the second device 402 at operation 420a, and the first device 404 transmits a control command for the third device to the third device 400 at operation 420b.

If it is impossible to connect to the base station 406 according to the determined result at operation 444, the first device 404 may determine a final host based on the status information of the devices collected at operations 432a to 432b. Here, an operation of determining a final host has been described in Table 1 to FIG. 2c, so a detailed description will be omitted herein. If the first device 404 is determined as the final host, the first device 404 performs operations 450 to 454 as a host. If the first device 404 determines another device as a final host, the first device 404 transmits host indication information to a corresponding device. Upon receiving this, a final host device may receive status information of devices from the first device 404, and may generate and transfer control information for each device based on this.

Figure 5:
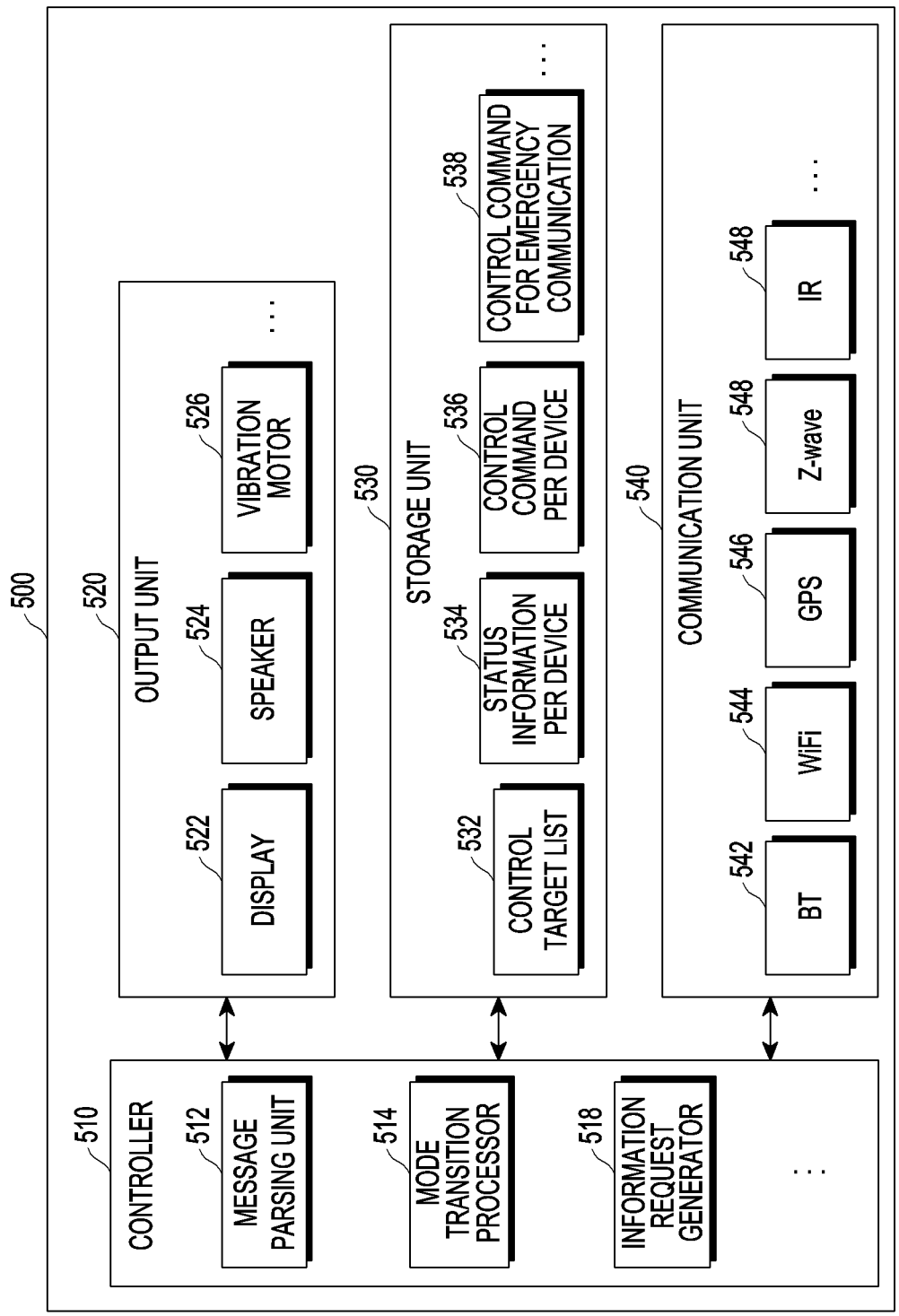
FIG. 5 is an example of a block diagram of a mobile device for performing an emergency communication according to an embodiment of the present disclosure.

FIG. 5 is an example of a block diagram of a mobile device for performing an emergency communication according to an embodiment of the present disclosure.

Referring to FIG. 5, a mobile device 500 may include, for example, a controller 510, an output unit 520, a storage unit 530, and a communication unit 540. Configuration of the mobile device 500 in FIG. 5 is shown as an example for convenience of description, however, each component may be divided into sub-units for performing specified operations or may be implemented with an integrated unit for integrating part of operations to perform the integrated operation according to a provider's intention or an embodiment.

The controller 510 controls an overall operation for an emergency communication according to an embodiment of the present disclosure. For this, the controller 510 may include, for example, a message parsing unit 512, a mode transition processor 514, an information request generator 518, and/or the like. When emergency mode-related information is requested from a base station (server), the message parsing unit 512 may transfer activation request to an emergency mode to the mode transition processor 514. The mode transition processor 514 may be operated in three ways according to an embodiment of the present disclosure. Firstly, the mode transition processor 514 may transition to an emergency mode when the activation request is transferred from the message parsing unit 512 and a user input which corresponds to a response to the emergency mode-related information is sensed through the communication unit 540. Secondly, the mode transition processor 514 may automatically transition to the emergency mode if the user input is not input until a timer included in the emergency mode-related information expires. Thirdly, the mode transition processor 514 may transition to the emergency mode if the mobile device 500 equips a separate sensor module for sensing an emergency situation, and the emergency situation is sensed through the sensor module, or an activation command to the emergency mode is received through a user input. Although not shown, the sensor module may be implemented with, for example, various sensors such as a sensor for sensing motion or a location of an object, a terrestrial magnetism sensor, an acceleration sensor, and/or the like, a composite sensor in which a function such as an altimeter, a gyro, and/or the like is included as one chip, and/or the like. The controller 510 may perform a low power-management function for minimizing power of the mobile device 500 upon an emergency communication. Concretely, if an emergency situation is sensed through the sensor module, a sensing period of the sensor module and a communication method of a mobile device may be managed suitable for an emergency communication based on a predetermined condition. For example, when it is transitioned to an emergency mode, the controller 510 may set a limited communication such that only information which is transmitted to and received from a rescue or a related server is transmitted to a client device on a program or an application which is run in connection with an emergency communication.

The mobile device 500 according to an embodiment of the present disclosure may support a charging technology for obtaining additional power as well as current battery power for an emergency communication. In this case, the controller 510 may, for example, activate the charging technology or perform automatic control if battery charge is less than a threshold value after the mobile device 500 transitions to an emergency mode. The charging technology may be, for example, a scheme of using energy harvesting. The energy harvesting is a scheme of charging using a wireless signal, a sound, and/or the like. As a specific example, if a sound wave vibration with a magnitude larger than a predetermined magnitude occurs, some voltage may be generated by occurring frictional electricity. Alternatively, a technology for converting a user's body temperature or surrounding heat into electricity, or generating electricity according to temperature variation between the inside and the outside, and/or the like may be used. Upon receiving status information request from the outside through the communication unit 540, the information request generator 518 may generate and transfer a response to this. Information included in status information has been described above, and a detailed description will be omitted herein.

After the mobile device 500 transitions to the emergency mode, the communication unit 540 supports a connection with other devices which a user of the mobile device has or other user's devices. Here, a connection with devices may be performed based on device-to-device wireless communication technology which the mobile device 500 supports. A case that the wireless communication technology which the mobile device 500 supports is, for example, Bluetooth 542, Wi-Fi 544, Z-wave 548, and an infrared ray (IR) 550 is shown. The communication unit 540 obtains location information of the mobile device 500 by equipping a GPS 546, and may include the location information into a response when status information is requested from the outside to transfer the response. If the mobile device 500 supports a near field communication (NFC) function, the mobile device 500 may set the NFC function to be used for the first connection with another device located within a touchable distance.

Upon connecting to another device, the communication unit 540 may connect to the another device by discovering a new target device using a device-to-device communication technology or selecting a target device using a list of devices for which pairing is received as described in FIG. 1*a*.

After transitioning to an emergency mode, the controller 510 determines host determination authority to directly determine a final host, or transfers determination authority to a base station if a connection with the base station is possible as described in FIG. 4*b*, and may receive determined host indication information from the base station.

The storage unit 530 may store, for example, a control target list 532, status information per device 534, a control command per device 536, a control command for an emergency communication 538, and/or the like. The control target list 532 includes the same or another user's devices which are currently connected for an emergency communication after transitioning to an emergency mode. The status information per device 534 may be stored as a form in which information obtained through a response to status information request transmitted from the mobile device 500 which operates as a temporary host to connected devices is mapped to a corresponding device. The control command per device 536 may be generated as a form which includes activation indication information for a function to be operated upon an emergency communication based on the status information per device, and/or the like. The control command for the emergency communication 538 may store emergency communication-related information received from a server.

The output unit 520 may include a display 522 which may display a message transmitted to and received from the communication unit 540, an image, and/or the like, a speaker 524 which outputs a voice, a vibration motor 526 which may notify, with vibration, that emergency communication-related information, a response to status request information, and/or the like are received from the communication unit 540, and/or the like.

Meanwhile, an example in which a mobile device transitioned to an emergency mode performs an emergency communication while minimizing power consumption by performing an operation in FIGS. 3a to 4b to connect to the same user's devices or peripheral devices has been described in embodiments of the present disclosure. If there are a plurality of rescue targets at a place where an emergency situation occurs, an operation of a mobile device as described above may be performed at one or more mobile devices, a connection among devices for an emergency communication may be expanded at a relatively large place through an operation of the one or more mobile devices.

Certain aspects of the present disclosure may also be embodied as computer readable code on a non-transitory computer readable recording medium. A non-transitory computer readable recording medium is any data storage device that can store data, which can be thereafter read by a computer system. Examples of the non-transitory computer readable recording medium include read only memory (ROM), random access memory (RAM), CD-ROMs, magnetic tapes, floppy disks, optical data storage devices, and carrier waves (such as data transmission through the Internet). The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

It can be appreciated that a method and apparatus according to an embodiment of the present disclosure may be implemented by hardware, software and/or a combination thereof. The software may be stored in a non-volatile storage, for example, an erasable or re-writable ROM, a memory, for example, a RAM, a memory chip, a memory device, or a memory such as an integrated circuit, or an optically or magnetically recordable non-transitory machine-readable (e.g., computer-readable), storage medium (e.g., a compact disk (CD), a DVD, a magnetic disk, a magnetic tape, and/or the like). A method and apparatus according to an embodiment of the present disclosure may be implemented by a computer or a mobile terminal that includes a controller and a memory, and the memory may be an example of a non-transitory machine-readable (e.g., computer-readable), storage medium suitable to store a program or programs including instructions for implementing various embodiments of the present disclosure.

The present disclosure may include a program including code for implementing the apparatus and method as defined by the appended claims, and a non-transitory machine-readable (e.g., computer-readable), storage medium storing the program. The program may be electronically transferred via any media, such as communication signals, which are transmitted through wired and/or wireless connections, and the present disclosure may include their equivalents.

An apparatus according to an embodiment of the present disclosure may receive the program from a program providing device which is connected to the apparatus via a wire or a wireless and store the program. The program providing device may include a memory for storing instructions which instruct to perform a content protect method which has been already installed, information necessary for the content protect method, and the like, a communication unit for performing a wired or a wireless communication with a graphic processing device, and a controller for transmitting a related program to a transmitting/receiving device based on a request of the graphic processing device or automatically transmitting the related program to the transmitting/receiving device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. A method of a mobile device for performing communication with at least one peripheral device in a wireless communication system, the method comprising:
    based on identifying an emergency situation, determining whether a determination criterion is satisfied, the determination criterion including receiving, by the mobile device, emergency communication related information transmitted from a base station or another user's mobile device that senses the emergency situation;
    in response to the determination criterion being satisfied, operating the mobile device as a temporary client for emergency communication; and
    in response to the determination criterion not being satisfied, performing, by the mobile device, operations including:
        determining to operate the mobile device as a temporary host,
        activating an emergency mode and connecting with the at least one peripheral device,
        collecting status information associated with the at least one peripheral device,
        checking access status with the base station,
        in response to an access with the base station being possible,
    transferring the collected status information for the at least one peripheral device to the base station and, upon receiving host indication information from the base station, transferring the host indication information to a peripheral device indicated by the host indication information among the at least one peripheral device, and receiving control information from the peripheral device, and
    in response to the access with the base station not being possible, determining a priority of status information of the mobile device and a priority status of the at least one peripheral device, and determining a host for the emergency communication supported on the emergency mode among the mobile device and the at least one peripheral device based on the determined priority.

2. The method of claim 1, wherein the activating the emergency mode comprises activating a communication function with the base station and a communication function with the at least one peripheral device to respond to the emergency communication supported on the emergency mode.

3. The method of claim 1, wherein the control information received from the peripheral device includes information indicating activation of a communication function with the peripheral device and a part of deactivated remaining functions.

4. The method of claim 1, wherein the activating the emergency mode comprise:

upon receiving information indicating the emergency communication related information from the base station, driving a timer for the emergency communication; and unless a user input is sensed while the timer is driven, automatically activating the emergency mode.

5. The method of claim 1, wherein the status information includes at least one of a type, a function, and battery status, a number of devices which are currently connected to the at least one peripheral device, and location information of the at least one peripheral device.

6. The method of claim 1, wherein the priority is varied according to a type of the emergency situation.

7. The method of claim 1, further comprising:

upon receiving the host indication information indicating the mobile device from the base station, generating control information for each of at least one neighbor device based on the status of the at least one peripheral device; and transmitting the control information for each of at least one neighbor base station to each of the at least one neighbor device.

8. The method of claim 7, wherein the control information for each of the at least one neighbor device includes information indicating activation of a communication function with the mobile device and information indicating deactivation of remaining functions except for part of functions of a corresponding neighbor base station.

9. A mobile device configured to perform emergency communication with at least one neighbor device in a wireless communication system, the mobile device comprising:

a transceiver configured to connect with at least one peripheral device; and a controller configured to:
based on identifying an emergency situation, determine whether a determination criterion is satisfied, the determination criterion including receiving, by the mobile device, emergency communication related information transmitted from a base station or another user's mobile device that senses the emergency situation, in response to the determination criterion being satisfied, operate the mobile device as a temporary client for the emergency communication, and in response to the determination criterion not being satisfied:
determine to operate the mobile device as a temporary host,
activate an emergency mode and connect with the at least one peripheral device,
collect status information associated with the at least one peripheral device,
check access status with the base station,
in response to an access with the base station being possible, transfer the collected status information for the at least one peripheral device to the base station and, upon receiving host indication information from the base station, transfer the host indication information to a peripheral device indicated by the host indication information among the at least one peripheral device, and receive control information from the peripheral device, and in response to the access with the base station not being possible, determine a priority of status information of the mobile device and a priority status of the at least one peripheral device, and determine a host for the emergency communication supported on the emergency mode among the mobile device and the at least one peripheral device based on the determined priority.

10. The mobile device of claim 9, wherein, the controller is configured to activate a communication function with the base station and a communication function with the at least one peripheral device to respond to the emergency communication supported on the emergency mode and deactivate remaining functions upon transitioning to the emergency mode.

11. The mobile device of claim 10, wherein the control information received from the peripheral device includes information indicating activation of the communication function with the peripheral device and a part of deactivated remaining functions.

12. The mobile device of claim 9, wherein the controller is configured to drive a timer for the emergency communication when the transceiver receives information indicating the emergency communication from the base station, and to automatically transition to the emergency mode unless a user input is sensed while the timer is driven.

13. The mobile device of claim 9, wherein the status information includes at least one of a type, a function, and battery status, a number of devices which are currently connected to the at least one peripheral device, and location information of the at least one peripheral device.

14. The mobile device of claim 9, wherein the priority is varied according to a type of the emergency situation.

15. The mobile device of claim 9, wherein the controller is configured to generate control information for each of the at least one neighbor device based on the status of the at least one peripheral device when the transceiver receives the host indication information indicating the mobile device from the base station, and wherein the transceiver is configured to transmit the control information for each of at least one neighbor base station to each of the at least one neighbor device.

16. The mobile device of claim 15, wherein the control information for each of the at least one neighbor device includes information indicating activation of a communication function with the mobile device and information indicating deactivation of remaining functions except for part of functions of a corresponding neighbor base station.

* * * * *